United States Patent
Dwari et al.

(10) Patent No.: US 11,424,692 B2
(45) Date of Patent: Aug. 23, 2022

(54) MULTI-LEVEL SINGLE-PHASE AC-TO-DC CONVERTER

(71) Applicant: Hamilton Sundstrand Corporation, Charlotte, NC (US)

(72) Inventors: Suman Dwari, Vernon, CT (US); Brian St. Rock, Andover, CT (US); Jeffrey Ewanchuk, Manchester, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/132,244

(22) Filed: Dec. 23, 2020

(65) Prior Publication Data

US 2022/0200473 A1    Jun. 23, 2022

(51) Int. Cl.
*H02M 7/217* (2006.01)
*H02M 7/155* (2006.01)
*H02M 7/23* (2006.01)
*B64D 41/00* (2006.01)

(52) U.S. Cl.
CPC ......... *H02M 7/217* (2013.01); *H02M 7/1557* (2013.01); *H02M 7/23* (2013.01); *B64D 41/00* (2013.01)

(58) Field of Classification Search
CPC ............ H02M 7/02; H02M 7/04; H02M 7/05; H02M 7/06; H02M 7/064; H02M 7/08; H02M 7/12; H02M 7/155; H02M 7/1555; H02M 7/1557; H02M 7/1623; H02M 7/1626; H02M 7/17; H02M 7/21;
(Continued)

(56) References Cited

U.S. PATENT DOCUMENTS

| 7,050,313 | B2 | 5/2006 | Huang et al. |
| 7,808,219 | B2 | 10/2010 | Ye et al. |
| 9,048,756 | B2 | 6/2015 | Dong et al. |

(Continued)

FOREIGN PATENT DOCUMENTS

| CN | 111669044 | * | 9/2020 | .......... H02M 1/4233 |
| EP | 2975753 A1 | | 1/2016 | |

OTHER PUBLICATIONS

European Search Report for Application No. 21206981.9, dated Apr. 20, 2022, 11 pages.
(Continued)

*Primary Examiner* — Levi Gannon
(74) *Attorney, Agent, or Firm* — Cantor Colburn LLP

(57) ABSTRACT

System and methods for power conversion are provided. Aspects include a first switching module comprising a first set of switches, wherein the first set of switches comprise wide-bandgap devices having a first bandgap, a second switching module comprising a second set of switches, wherein the second set of switches comprise semiconductor devices having a second bandgap, and wherein the first bandgap is larger than the second bandgap, an alternating current (AC) power source connected to the first switching module and the second switching module, a first capacitor bank, a second capacitor bank, and a controller configured to operate the first switching module and the second switching module to create a first direct current (DC) voltage across the first capacitor bank and a second direct current (DC) voltage across the second capacitor bank.

18 Claims, 3 Drawing Sheets

(58) Field of Classification Search
CPC .... H02M 7/217; H02M 7/2173; H02M 7/219;
H02M 7/2195; H02M 7/23
See application file for complete search history.

(56) References Cited

U.S. PATENT DOCUMENTS

| | | | |
|---|---|---|---|
| 9,077,237 | B2 | 7/2015 | Ganev et al. |
| 10,014,790 | B2 | 7/2018 | Leadingham |
| 10,523,088 | B2 | 12/2019 | Dharmadhikari et al. |
| 10,742,133 | B1 | 8/2020 | Feng |
| 2014/0233279 | A1* | 8/2014 | Kondo .................. H02M 7/217 363/37 |
| 2015/0357937 | A1* | 12/2015 | Takahara ............ H02M 1/0095 363/97 |
| 2017/0214324 | A1* | 7/2017 | Fujita .................... H02M 7/217 |
| 2019/0067932 | A1* | 2/2019 | Li ........................... H02M 1/08 |
| 2020/0006970 | A1* | 1/2020 | Chen ....................... H02M 1/36 |
| 2020/0212819 | A1* | 7/2020 | Hirata ................. H02M 1/0096 |
| 2020/0220471 | A1* | 7/2020 | Kikuchi .................. H02M 1/36 |
| 2021/0344277 | A1* | 11/2021 | Toyoda ............... H02M 1/0009 |

OTHER PUBLICATIONS

Hodge Kevin C et al: "A New High-Frequency Multilevel Boost Power Factor Correction Approach With GaN Semiconductors", 2020 IEEE Energy Conversion Congress and Exposition (ECCE), IEEE, Oct. 11, 2020 (Oct. 11, 2020), pp. 5736-5743, XP033850574.
Wang Dakai et al: "AC-DC Converter with Hybrid Three-Level and Two-Level Legs Using Space Vector Modulation or Medium-Voltage SST Applications", 2019 IEEE Energy Conversion Congress and Exposition (ECCE), IEEE, Sep. 29, 2019 (Sep. 29, 2019), pp. 5029-5035, XP033666388.
Zhang, Li, et al. "A Family of Five-Level Dual-Buck Full-Bridge Inverters for Grid-Tied Applications", IEEE Transactions an Power Electronics, Institute of Electrical and Electronics Engieers, USA, vol. 31, No. 10, Oct. 1, 2016 (Oct. 1, 2016), pp. 7029-7042, XP011610998.

* cited by examiner

MULTI-LEVEL SINGLE-PHASE AC-TO-DC CONVERTER

BACKGROUND

The present invention generally relates to AC/DC converters, and more specifically, to a multi-level, single-phase AC-to-DC converter.

Rectifiers are commonly employed in aerospace, marine, and terrestrial vehicles, electrical power networks and systems, variable speed drives, grid interfaces for renewable energy sources, electrical energy storage systems, and telecommunications systems to convert alternating current (AC) power into direct current (DC) power. Rectifiers can include solid-state devices such as diodes, metal oxide field effect transistors (MOSFETs), insulated gate bipolar transistors (IGBTs), or gate turn-off device (GTOs) arranged between an AC power source and a DC load. Such solid-state devices typically have electrical stress limits that determine the maximum output power that a rectifier can reliably provide. Since the need of some rectifier applications can exceed the rating of such solid-state devices, some rectifiers employ the devices in a multilevel topology. Such topologies generally include numbers of solid-state devices that scale with the number of voltage levels in the topology, one exemplary N-level topology including N−1 capacitors and 2(N−1) solid-state switch devices clamped by diodes for each voltage level. Conventional topologies can also require voltage balancing circuitry to control and balance the DC link capacitor voltages, potentially reducing the power density, efficiency and reliability of such rectifiers.

Such conventional methods and systems have generally been considered satisfactory for their intended purpose. However, there is still a need in the art for improved multilevel rectifiers. There is also a continuing need for rectifiers with greater power density, reliability, and efficiency.

Lower voltage power devices are more efficient, i.e. on-state resistance per unit area decreases with decreasing voltage. However, the additional gate drivers add cost. Secondary voltage output ports require additional power components to form a secondary conversion stage. The conversion efficiency in the second stage is compromised by having to share the same common input voltage as the first voltage output port.

BRIEF DESCRIPTION

Embodiments of the present invention are directed to a power converter system. A non-limiting example of the system includes a first switching module comprising a first set of switches, wherein the first set of switches comprise wide-bandgap devices having a first bandgap, a second switching module comprising a second set of switches, wherein the second set of switches comprise semiconductor devices having a second bandgap, and wherein the first bandgap is larger than the second bandgap, an alternating current (AC) power source connected to the first switching module and the second switching module, a first capacitor bank, a second capacitor bank, and a controller configured to operate the first switching module and the second switching module to create a first direct current (DC) voltage across the first capacitor bank and a second direct current (DC) voltage across the second capacitor bank.

Embodiments of the present invention are directed to a method. A non-limiting example of the method includes providing a first switching module comprises a first set of switches, providing a second switching module comprising a second set of switches, providing an alternating current (AC) power source connected to the first switching module and the second switching module, operating, by a controller, a first switching module and a second switching module to create a first direct current (DC) voltage across a first capacitor bank and a second direct current (DC) voltage across a second capacitor bank.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
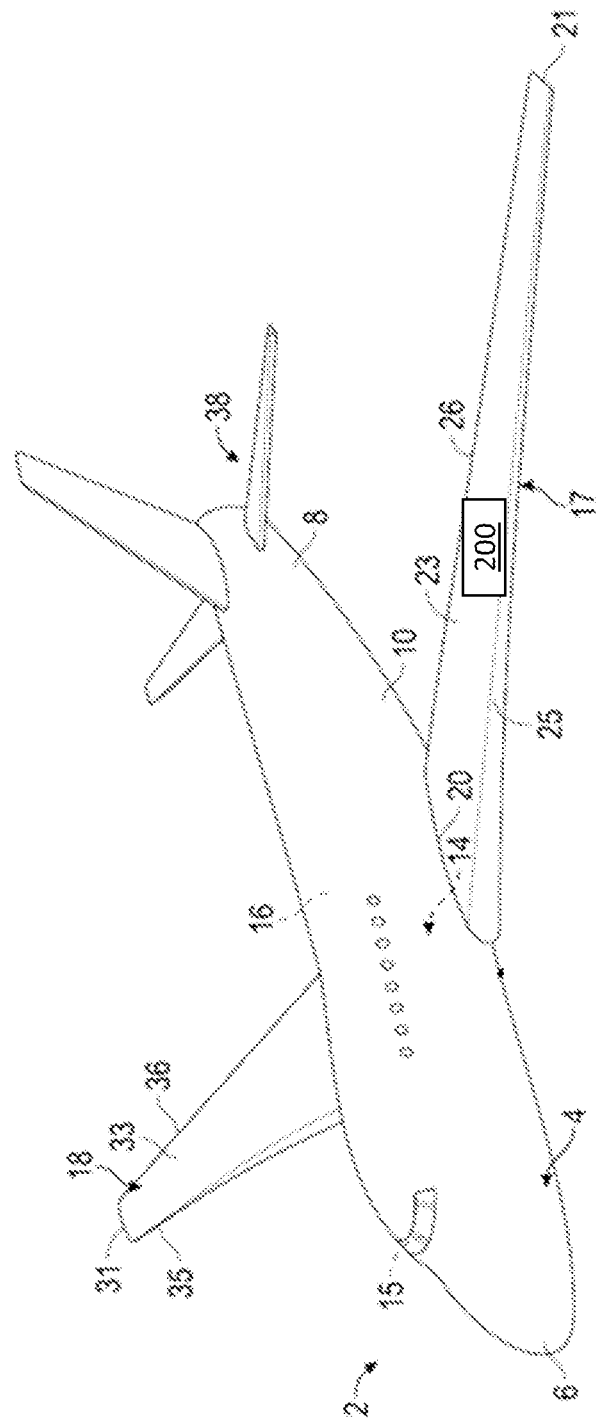
FIG. 1 is a perspective view of an aircraft that may incorporate embodiments of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Referring now to the figures, a perspective view of an aircraft 2 that may incorporate various components of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger or cargo compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 54 configured to provide propulsion to the aircraft 2. The aircraft 2 also includes one or more power converters 200 (described in greater detail in FIG. 2).

Turning now to an overview of technologies that are more specifically relevant to aspects of the disclosure, power converter technology utilized for single-phase, AC-to-DC (AC/DC) conversion typically includes multiple stages (e.g., rectifier, boost converter). This conventional technology requires large, passive components and high loses to convert the power electronically. Hence, such solutions make converters inefficient, heavy and large in volumes which are not suitable for weight limited applications such as aerospace power conversions.

Wide-bandgap semiconductors (also known as WBG semiconductors, WBGSs, or Wide-bandgap devices) are semiconductor materials which have a relatively large band gap compared to conventional semiconductors. Conventional semiconductors like silicon have a bandgap in the range of 1-1.5 electronvolt (eV), whereas wide-bandgap materials have bandgaps in the range of 2-4 eV. Generally, wide-bandgap semiconductors have electronic properties which fall in between those of conventional semiconductors and insulators. Wide bandgap devices include Gallium Nitride semiconductors. Wide bandgap devices are enabling extremely high power densities for power converters when compared to their traditional silicon based predecessors. However, the cost of these new wide bandgap devices is still much greater when compared to the silicon devices. Thus, more advanced topologies that can provide further increases in a power converters density are often not possible due to cost limitations alone. While wide bandgap devices enable better performance on a device level, the cost limitations limit the gain possible when both cost constraints and power density goals are targeted which can be the case in aerospace applications. Further, irrespective of the type of semiconductor, the cost of said component is at least proportional to the thickness of the semiconductor which is directly related to the voltage blocking capability. This allows for more complex convert topologies that can be a high performance in a cost neutral setting.

Turning now to an overview of the aspects of the invention, one or more embodiments of the disclosure address the above-described shortcomings of the prior art by providing a single-phase, AC/DC power converter that combines the high performance of low voltage wide band-gap devices with the cost effectiveness of silicon based semiconductors and may achieve a high performance AC/DC stage with a high power density.

Figure 2:
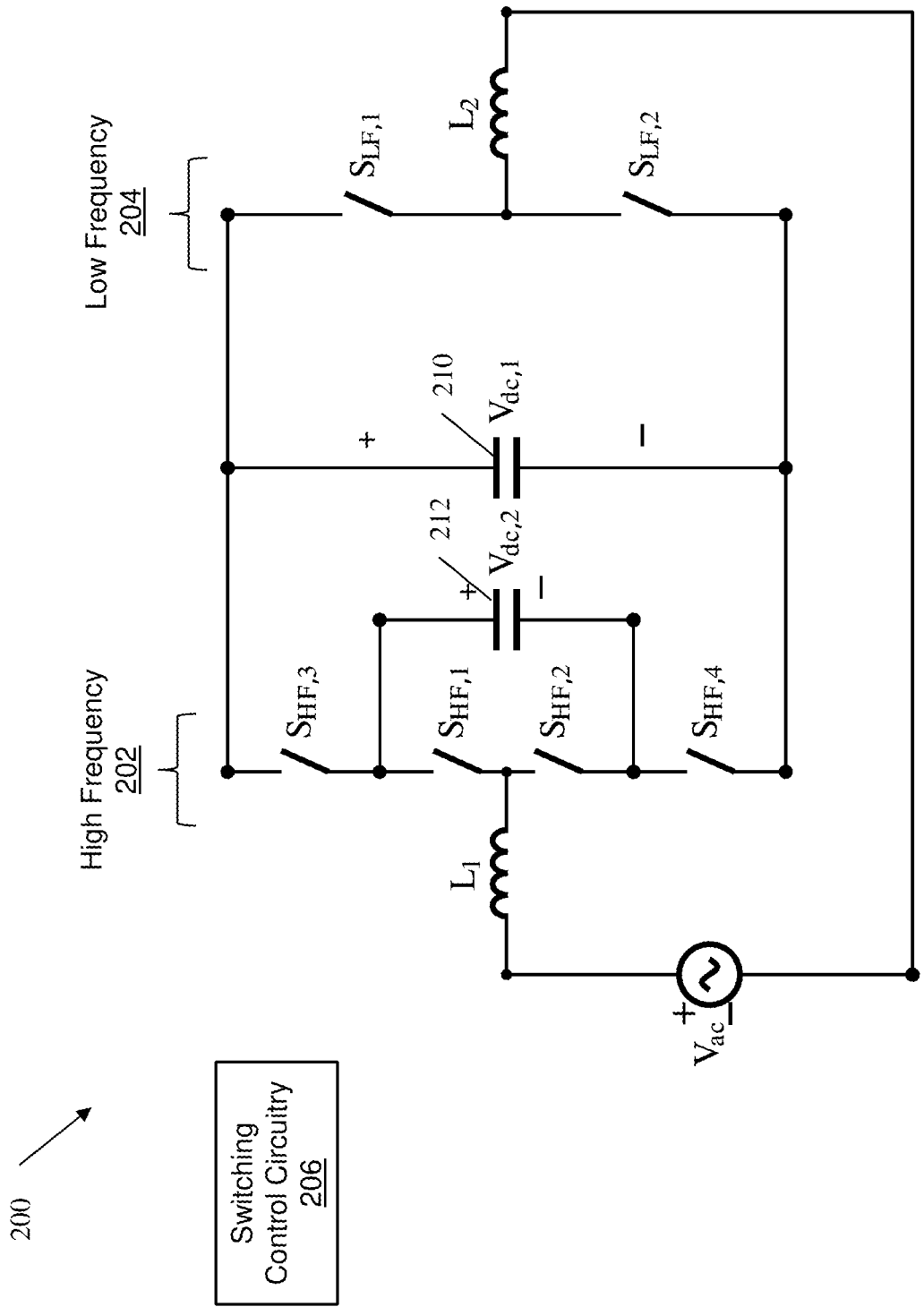
FIG. 2 depicts of a circuit diagram of a power converter 200 with a high frequency multi-level and low frequency two-level conversion stage according to one or more embodiments.

FIG. 2 depicts of a circuit diagram of a power converter 200 with a high frequency multi-level and low frequency two-level conversion stage according to one or more embodiments. The power converter 200 in connected to an alternating current (AC) power supply Vac. The power supply Vac is connected to a high frequency switching module 202 through a first filter inductor L1. The high frequency switching module 202 includes four switching elements or switches (Shf,1, Shf,2, Shf,3, Shf,4). The power supply Vac is also connected to a low frequency switching module 204 through a second filter inductor L2. The low frequency switching module includes two switching elements or switches (Slf,1, Slf,2).

In one or more embodiments, the high frequency switching module 202 is a multi-level pulse-width modulated (PWM) conversion leg that is used in a differential manner with the low frequency switching module 204 which is a two-level silicon based conversion leg that is modulated at the power conversion frequency. In one or more embodiments, the high frequency ripple across the two filter inductors (L1 and L2) is reduced by the differential addition of the low frequency switching module 204, allowing the inductance to be lowered for the same current ripple. Thus, the volume of the inductors is able to be reduced with additional voltage levels of the LF conversion leg where the volume is proportional to $L*I^2$. This LF conversion leg (204, L2) is modulated at the power conversion frequency and little to no switching losses are produced. However, the modulation of the LF conversion leg is in phase with the produced output current such that no distortions exist due to the unintended conduction of the free-wheeling diodes of the LF switches (Slf,1, Slf,2) in the case of the LF switching being IGBTs. In one or more embodiments, the LF switches (Slf,1, Slf,2) can be insulated-gate bipolar transistors (IGBTs), metal-oxide-semiconductor field effect transistors (MOSFETs), and/or any other suitable silicon based switching element. Switching losses occur in the high frequency switching module 202 because of the use of high frequency wide-bandgap devices which have inherently low switching losses due to being able to employ devices in a low voltage multi-level configuration as depicted in FIG. 2. This approach uses a differential output voltage combination of low voltage HF switches (Shf,1, Shf,2, Shf,3, Shf,4) and high voltage LF switches (Slf,1, Slf,2) to maximize the cost, efficiency, and conversion quality of the converter. The HF switches are being operated by control circuitry 206 using pulse width modulation and the LF switches are being operated by the control circuitry 206 at a lower frequency.

In one or more embodiments, the power converter 200 includes switching control circuitry 206 that is configured to control the switching operation of the HF switching module 202 and the LF switching module 204 including each of the switches (Shf,1, Shf,2, Shf,3, Shf,4, Slf,1, Slf,2). The switching modules 202, 204 are operated by the control circuitry 206 to produce a direct current (DC) voltage output. The output of the power converter 200 includes a first voltage Vdc,1 which is the voltage across the first capacitor bank 210. The output also includes a second voltage Vdc,2 which is the voltage across the second capacitor bank 212. The first capacitor bank 210 and the second capacitor bank 212 and each include one or more capacitors. In one or more embodiments, the first voltage Vdc,1 can be greater than the second voltage Vdc,2. Vdc,2 is an integer multiple of Vdc1, and always smaller than Vdc1. Vdc2 is charged by adding offsets to the low voltage HF switch (Shf,1, Shf,2, Shf,3, Shf,4) pattern to regulate the capacitor voltage on this output.

In one or more embodiments, the power converter 200 addresses the increasing cost and performance of semiconductor devices with lowering blocking voltages. The losses of a given semiconductor decreases non-linearly as a function of its rated blocking voltage. Furthermore, as thickness of the semiconductor device is lowered due to the reduced voltage blocking requirements, the cost of these components are reduced. However, the losses are not linear with the decreasing voltage rating of the component; hence, the addition of the low frequency leg 204 allows the power conversion to reduce total filter size within the power converter 200 and also optimize the use of the HF wide-bandgap devices in terms of cost. In one or more embodiments, the second (intermediate) voltage source Vdc,2 can be used as an input to a DC/DC converter stage in a multiport converter.

In one or more embodiments, the switching control circuitry 206 or any of the hardware referenced in the system 200 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

Figure 3:
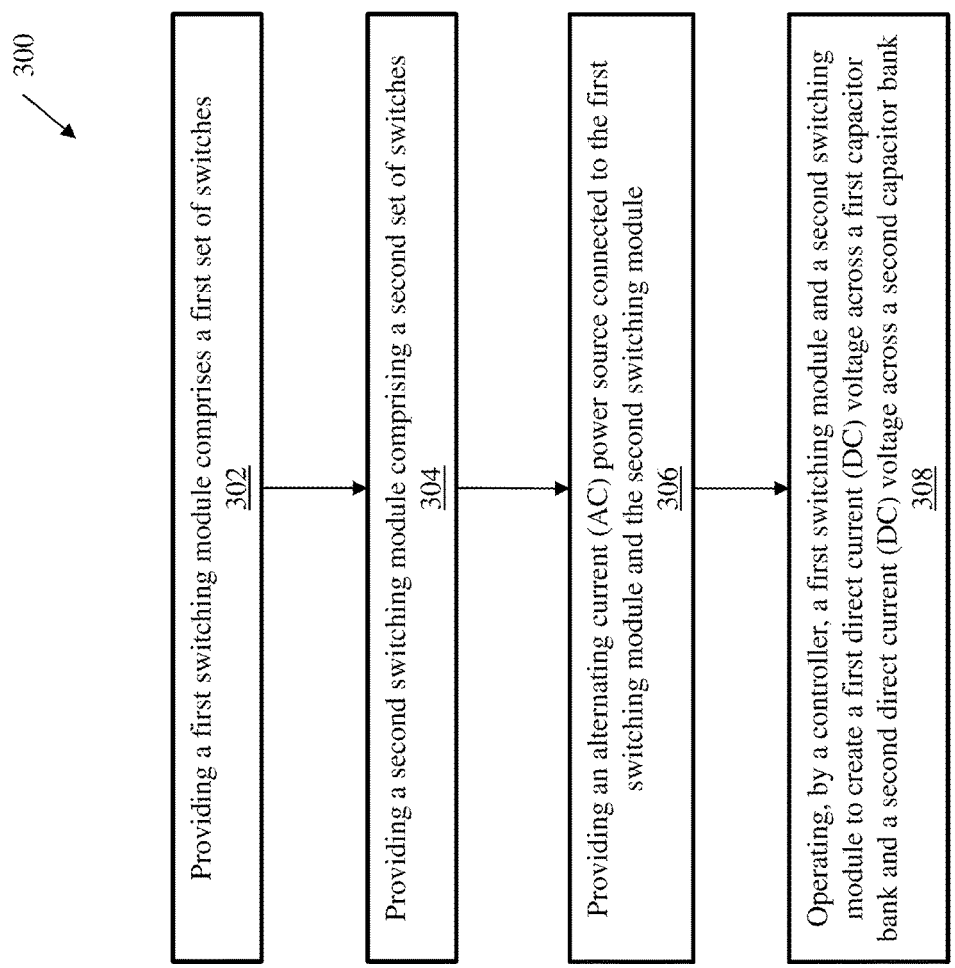
FIG. 3 depicts a flow diagram of a method for operating a power converter according to one or more embodiments.

FIG. 3 depicts a flow diagram of a method for operating a power converter according to one or more embodiments. The method 300 includes providing a first switching module comprises a first set of switches, as shown in block 302. At block 304, the method 300 includes providing a second switching module comprising a second set of switches. The method 300, at block 306, providing an alternating current (AC) power source connected to the first switching module and the second switching module. And at block 308, the method 300 includes operating, by a controller, a first switching module and a second switching module to create a first direct current (DC) voltage across a first capacitor bank and a second direct current (DC) voltage across a second capacitor bank.

Additional processes may also be included. It should be understood that the processes depicted in FIG. 3 represent illustrations, and that other processes may be added or existing processes may be removed, modified, or rearranged without departing from the scope and spirit of the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power converter system comprising:
   a first switching module comprising a first set of switches, wherein the first set of switches comprise wide-bandgap devices having a first bandgap, wherein the first set of switches are in series and comprise a first switch, a second switch, a third switch, and a fourth switch;
   a second switching module comprising a second set of switches, wherein the second set of switches comprise semiconductor devices having a second bandgap, and wherein the first bandgap is larger than the second bandgap;
   an alternating current (AC) power source connected to the first switching module and the second switching module;
   a first capacitor bank in parallel with the first switch, the second switch, the third switch, and the fourth switch;
   a second capacitor bank in parallel with the first switch and the second switch; and
   a controller configured to:
      operate the first switching module and the second switching module to create a first direct current (DC) voltage across the first capacitor bank and a second direct current (DC) voltage across the second capacitor bank, wherein the first DC voltage is greater than the second DC voltage.

2. The power converter system of claim 1, wherein the first switching module is operated at a first frequency and the second switching module is operated at a second frequency.

3. The power converter system of claim 2, wherein the first frequency is greater than the second frequency.

4. The power converter system of claim 2, wherein the first frequency comprises a pulse-width modulated frequency.

5. The power converter system of claim 2, wherein the second frequency comprises a line frequency of the AC power source.

6. The power converter system of claim 1, wherein the first set of switches comprises a first switch, a second switch, a third switch, and a fourth switch.

7. The power converter system of claim 1, wherein the second set of switches comprise a fifth switch and a sixth switch.

8. The power converter system of claim 1, wherein the first bandgap is twice as large as the second bandgap.

9. The power converter system of claim 1, wherein the second set of switches comprise insulated-gate bipolar transistors (IGBTs).

10. The power converter system of claim 1, further comprising:
    a first filter inductor; and
    a second filter inductor.

11. The power converter system of claim 10, wherein the AC power source is connected to the first switching module through the first filter inductor.

12. The power converter system of claim 10, wherein the AC power source is connected to the second switching module through the second filter inductor.

13. The power converter system of claim 1, further comprising:
    a first load connected to the first capacitor bank; and
    a second load connected to the second capacitor bank.

14. The power converter system of claim 13, wherein the second load comprises a DC-to-DC converter.

15. A method comprising:
    providing a first switching module comprises a first set of switches, wherein the first set of switches are in series and comprise a first switch, a second switch, a third switch, and a fourth switch;
    providing a second switching module comprising a second set of switches;
    providing an alternating current (AC) power source connected to the first switching module and the second switching module, wherein the first switching module is operated at a first frequency and the second switching module is operated at a second frequency;
    operating, by a controller, the first switching module and the second switching module to create a first direct current (DC) voltage across a first capacitor bank and a second direct current (DC) voltage across a second capacitor bank, wherein the first capacitor bank is in parallel with the first switch, the second switch, the third switch, and the fourth switch, wherein the second capacitor bank is in parallel with the first switch and the second switch, and wherein the first DC voltage is greater than the second DC voltage.

16. The method of claim 15, wherein the second set of switches comprise insulated-gate bipolar transistors (IGBTs).

17. The method of claim 15, wherein the AC power source is connected to the first switching module through a first filter inductor; and
    wherein the AC power source is connected to the second switching module through a second filter inductor.

18. A method comprising:
    providing a first switching module comprises a first set of switches, wherein the first set of switches are in series and comprise a first switch, a second switch, a third switch, and a fourth switch;
    providing a second switching module comprising a second set of switches;
    providing an alternating current (AC) power source connected to the first switching module and the second switching module;
    operating, by a controller, the first switching module and the second switching module to create a first direct current (DC) voltage across a first capacitor bank and a second direct current (DC) voltage across a second capacitor bank, wherein the first capacitor bank is in parallel with the first switch, the second switch, the third switch, and the fourth switch, wherein the second capacitor bank is in parallel with the first switch and the second switch, and wherein the first DC voltage is greater than the second DC voltage;
    wherein the first set of switches comprise wide-bandgap devices.

* * * * *